(12) United States Patent
Hett et al.

(10) Patent No.: US 11,800,437 B2
(45) Date of Patent: Oct. 24, 2023

(54) AUTOMATIC CONFIGURATION SWITCH FOR A NODE JOINED TO A WIRELESS NETWORK

(71) Applicant: Landis+Gyr Innovations, Inc., Alpharetta, GA (US)

(72) Inventors: Christopher Hett, Sandy Springs, GA (US); James Patrick Hanley, Decatur, GA (US); Chris Calvert, Roswell, GA (US)

(73) Assignee: Landis+Gyr Technology, Inc., Alpharetta, GA (US)

( * ) Notice: Subject to any disclaimer, the term of this patent is extended or adjusted under 35 U.S.C. 154(b) by 479 days.

(21) Appl. No.: 17/159,963

(22) Filed: Jan. 27, 2021

(65) Prior Publication Data
US 2022/0240164 A1 Jul. 28, 2022

(51) Int. Cl.
*H04W 48/16* (2009.01)
*G06F 3/06* (2006.01)
*G06F 9/4401* (2018.01)
*G06F 9/445* (2018.01)
*H04W 12/06* (2021.01)

(52) U.S. Cl.
CPC .......... *H04W 48/16* (2013.01); *G06F 3/0607* (2013.01); *G06F 3/0659* (2013.01); *G06F 3/0679* (2013.01); *G06F 9/4401* (2013.01); *G06F 9/445* (2013.01); *H04W 12/06* (2013.01)

(58) Field of Classification Search
None
See application file for complete search history.

(56) References Cited

U.S. PATENT DOCUMENTS

| | | | |
|---|---|---|---|
| 2016/0277206 A1* | 9/2016 | Calvert | H04J 3/1694 |
| 2019/0096230 A1* | 3/2019 | Tanabe | H04W 4/90 |
| 2020/0050753 A1* | 2/2020 | Davis | G06F 21/53 |
| 2020/0382972 A1 | 12/2020 | Cardozo et al. | |

FOREIGN PATENT DOCUMENTS

WO 2020/004742 A1 1/2020

OTHER PUBLICATIONS

De et al. Technical Report Communication Technologies in M2M/IoT Domain, TEC-TR-IoT-M2M-008-01, Ministry of Communications, Government of India; Available online at: https://tec.gov.inpdf/M2M/Communication%20Technologies%20in%20IoT%20domain.pdf, Jul. 5, 2017, 140 pages.

PCT Patent Application No. PCT/US2022/013599, International Search Report and Written Opinion, dated Apr. 22, 2022, 16 pages.

* cited by examiner

*Primary Examiner* — Frantz Bataille
(74) *Attorney, Agent, or Firm* — Kilpatrick Townsend & Stockton LLP (57) ABSTRACT

A deployed node may automatically switch from one configuration to another configuration. The node includes a first firmware image that corresponds to a first configuration and a second firmware image that corresponds to a second configuration. The node executes the first firmware image to run the first configuration. At some point, the node determines that a switch to the second configuration is appropriate and switches to the second configuration by activating the second firmware image. The switch does not require intervention by a central system or any manual intervention. In some instances, the configurations are associated with different communication protocols.

20 Claims, 7 Drawing Sheets

AUTOMATIC CONFIGURATION SWITCH FOR A NODE JOINED TO A WIRELESS NETWORK

TECHNICAL FIELD

The present invention is generally directed to updating nodes in a wireless network. More specifically, this invention relates to automatically switching a deployed node from one configuration to another configuration where the configurations are not backwards compatible, while maintaining reliable network communications.

BACKGROUND

A resource provider, such as a utility company, may deploy large numbers of metering, sensor, or actuator devices across its service areas. The devices many communicate via one or more wireless mesh networks. After a number of devices are deployed in the field, the resource provider may decide to update its devices to provide additional or enhanced functions. The enhanced functions may include a different communication protocol from the communication protocol previously used.

In some cases, there may be millions of existing devices that need to be replaced or updated. When the update includes new firmware, the new firmware may be provided by an over-the-air (OTA) download to the existing devices or by replacing the existing devices with new devices having the new firmware. Given the number of devices, these options generally require significant time and may be prone to network instability. When the new firmware implements a new communication protocol that is not backwards compatible with the existing communication protocol, managing the update is critical. Since the cost to replace all existing devices with new devices is significant, a resource provider may prefer a phased approach where existing devices may continue to execute the existing communication protocol as new devices that are capable of executing the new communication protocol are deployed.

SUMMARY

Some aspects of the present invention enable a node deployed in the field to switch from a first network using a first communication protocol to a second network using a second communication protocol. The node includes a first firmware image corresponding to a first communication protocol and a second firmware image corresponding to a second communication protocol.

The node executes the first firmware image to communicate on the first network running the first communication protocol. While the node is joined to the first network, it listens for PAN advertisement messages. It receives a PAN advertisement message and determines whether the PAN advertisement message is from a second network running a second communication protocol. When the PAN advertisement message is from the second network, then the node determines whether the second network is authorized. The node may consider the network identifier in the PAN advertisement message to determine if the second network is authorized. Additional criteria related to the second network, including signal strength and link quality may also be considered.

If the second network is authorized and any additional criteria is within predetermined limits, then the node activates the second firmware image. In some implementations, the node loads the second firmware image into an execution flash memory bank to activate the image. The node reboots, begins executing the second firmware image, and joins the second network.

There may be a reversion period after the node joins the second network. During the reversion period, the node evaluates reversion criteria to determine whether it is within a predetermined range or threshold. If the reversion criteria is within the predetermined range or threshold, then then node continues to operate on the second network. If the reversion criteria is outside the predetermined range or threshold, then then the node may revert to the first network. In some implementations, additional factors may be considered prior to determining that the node will revert to the first network.

These and other features, aspects, and advantages of the present disclosure are better understood when the following Detailed Description is read with reference to the accompanying drawings.

DETAILED DESCRIPTION

The present invention provides systems and methods that allow a deployed node to automatically switch from one configuration to another configuration. The node includes a first firmware image that corresponds to a first configuration and a second firmware image that corresponds to a second configuration. The node executes the first firmware image to run the first configuration. At some point, the node determines that a switch to the second configuration is appropriate and switches to the second configuration by activating the second firmware image. The switch does not require intervention by a central system or any manual intervention.

In one example, the configurations are associated with communication protocols. The first firmware image corresponds to an existing communication protocol and the second firmware image corresponds to a new communication protocol. The inclusion of the two firmware images allows the node to switch between the communication protocols while deployed in the field. The node initially operates using the first firmware image so that it communicates using the existing communication protocol. Once the node detects a network using the new communication protocol, the node may activate the second firmware image, join the network using the new communication protocol, and communicate using the new communication protocol. The node may consider various criteria when determining whether to switch to the second firmware image so that both networks can continue to operate reliably and acceptable network performance is maintained. The criteria are selected based on the implementation and may include factors such as the particular communication protocols used, the capabilities of the nodes, and the size of the networks.

Exemplary communication protocols used in channel hopping mesh networks include those based on IEEE 802.15.4, such as a time-slotted channel hopping ("TSCH") protocol and a wireless smart utility network (Wi-SUN) field area network (FAN) protocol. A network operator, such as a resource provider, can ensure reliability of both networks as it updates its equipment using a staged approach. For instance, by adding new nodes to the TSCH network that support both TSCH and Wi-SUN FAN protocols, the resource provider may ensure that nodes with the Wi-SUN FAN protocol only switch to the Wi-SUN FAN protocol when a sufficient number of neighbor nodes are available to form a reliable Wi-SUN FAN network. Additionally, the staged approach may also ensure that new nodes only switch to the Wi-SUN FAN protocol when a sufficient number of nodes remain on the TSCH network to provide a reliable TSCH network.

Exemplary Network Configurations

FIGS. 1-5 illustrate how a node that supports two communication profiles or protocols is initially joined to a TSCH network and then automatically switches to a Wi-SUN FAN network without requiring any manual or headend system (HES) intervention.

Figure 1:
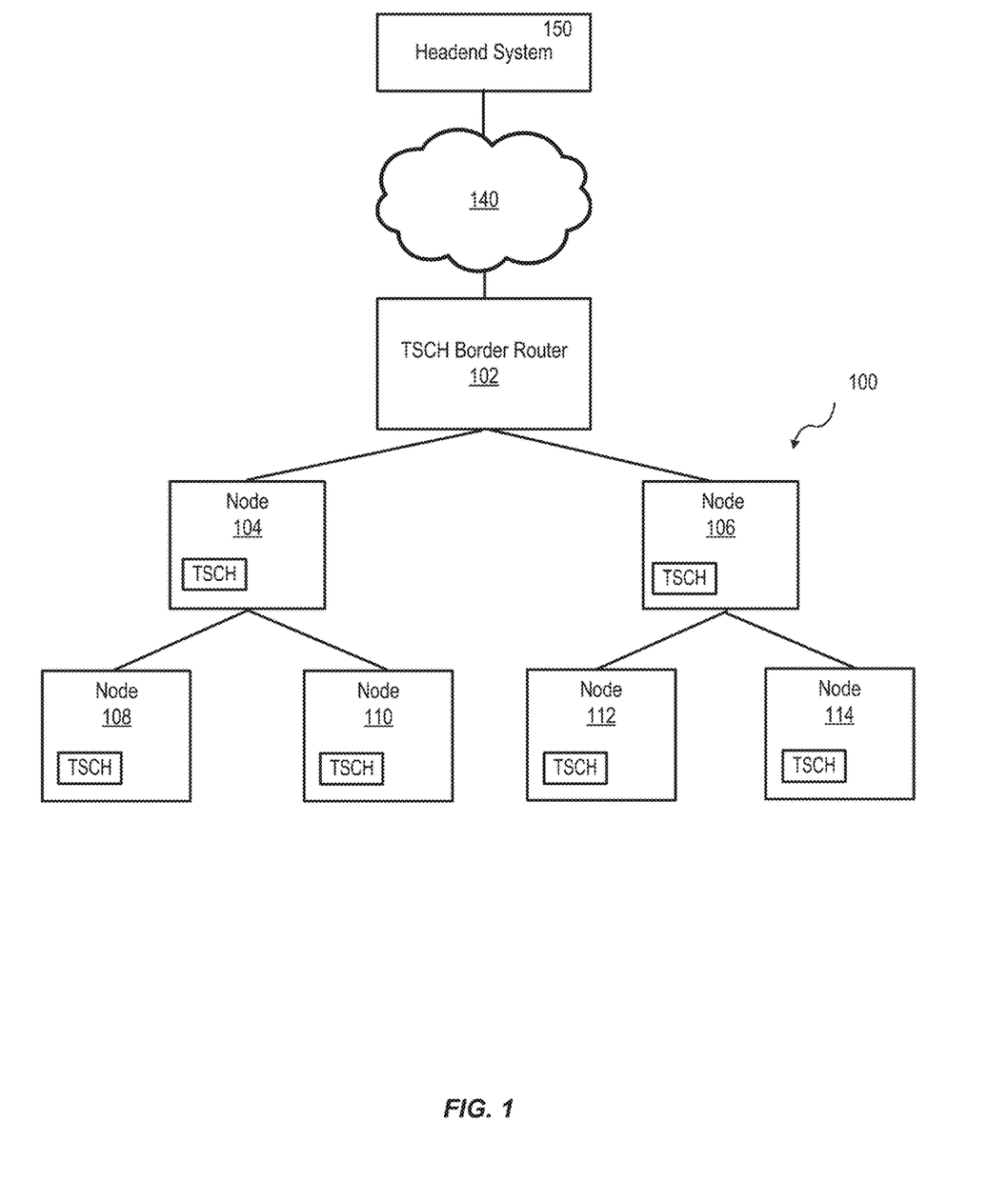
FIG. 1 is a block diagram illustrating an exemplary wireless network.

FIG. 1 illustrates a portion of an exemplary wireless network that includes a border router or PAN coordinator 102 and a number of nodes 104, 106, 108, 110, 112, 114, which form a TSCH PAN 100. The border router and the nodes are running a TSCH communication profile. Each of the nodes has a path back to the border router 102. In some cases the path back to the border router passes through one or more nodes. For example, the path for node 110 passes through node 104. The border router 102 communicates information between the nodes and the headend system 150 through one or more networks 140.

Figure 2:
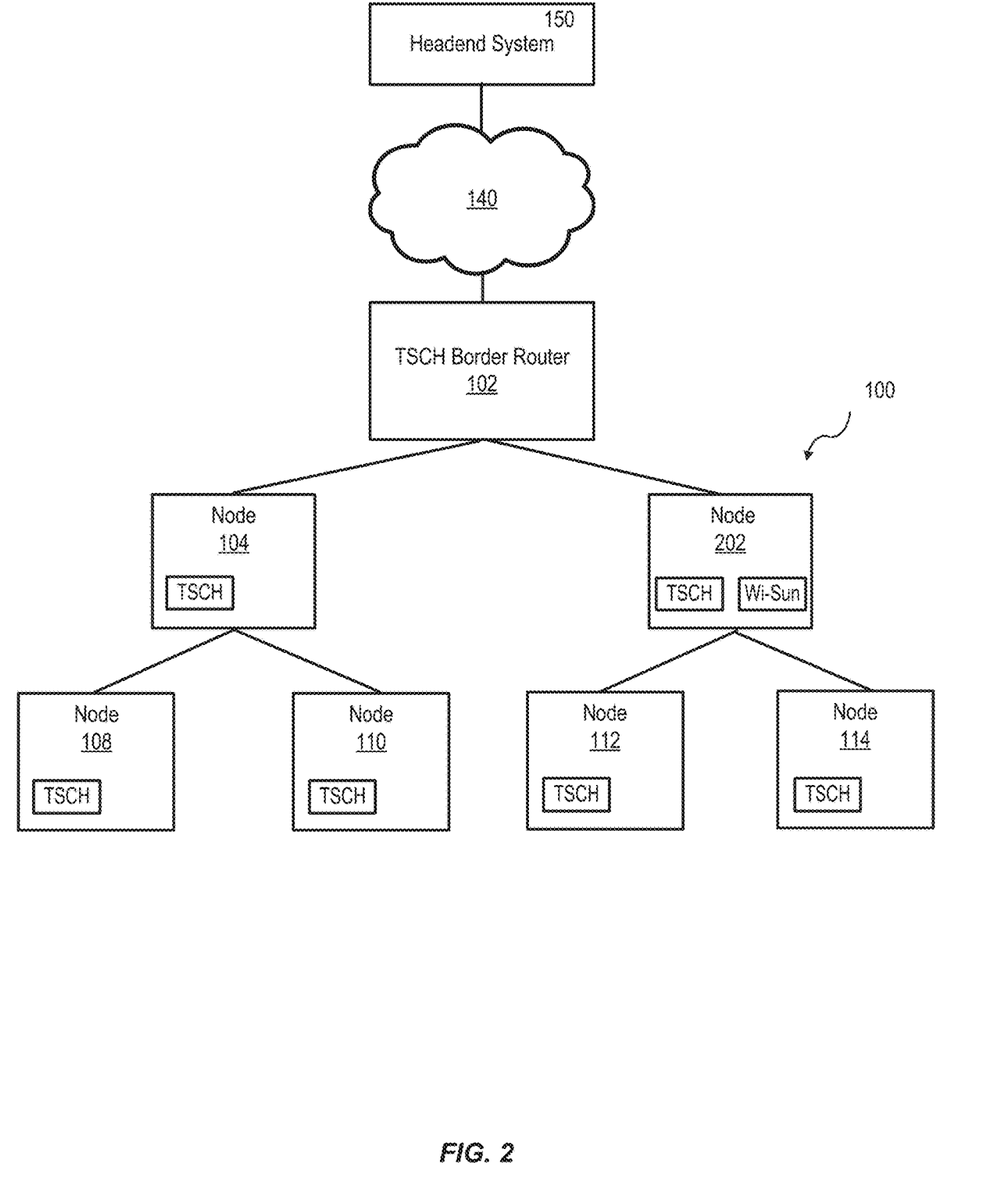
FIG. 2 is a block diagram illustrating an exemplary wireless network with an updated node.

FIG. 2 illustrates the network of FIG. 1 after node 106 is replaced with node 202. Node 202 includes two firmware images, one for the TSCH communication profile stored in an execution flash memory bank and one for a Wi-SUN FAN profile stored in a secondary flash memory bank. In FIG. 2, node 202 is joined to the TSCH network and is executing the firmware image that corresponds to the TSCH communication profile. Although FIG. 2 illustrates that nodes 112 and 114 are children of node 202, other configurations are possible. For example, when node 106 is removed from the network, nodes 112 and 114 may seek a new parent node and may remain with their new parent node even after node 202 joins the network.

While node 202 is joined to the TSCH network it performs background scans to listen for unsolicited PAN advertisement messages. The PAN advertisement messages may originate from nodes in other PANs (not shown), including other TSCH PANs. Nodes 104, 108, 110, 112, 114 perform similar background scans to listen for unsolicited PAN advertisement messages. In this example, the nodes remain on the current PAN, as shown in FIG. 2.

Figure 3:
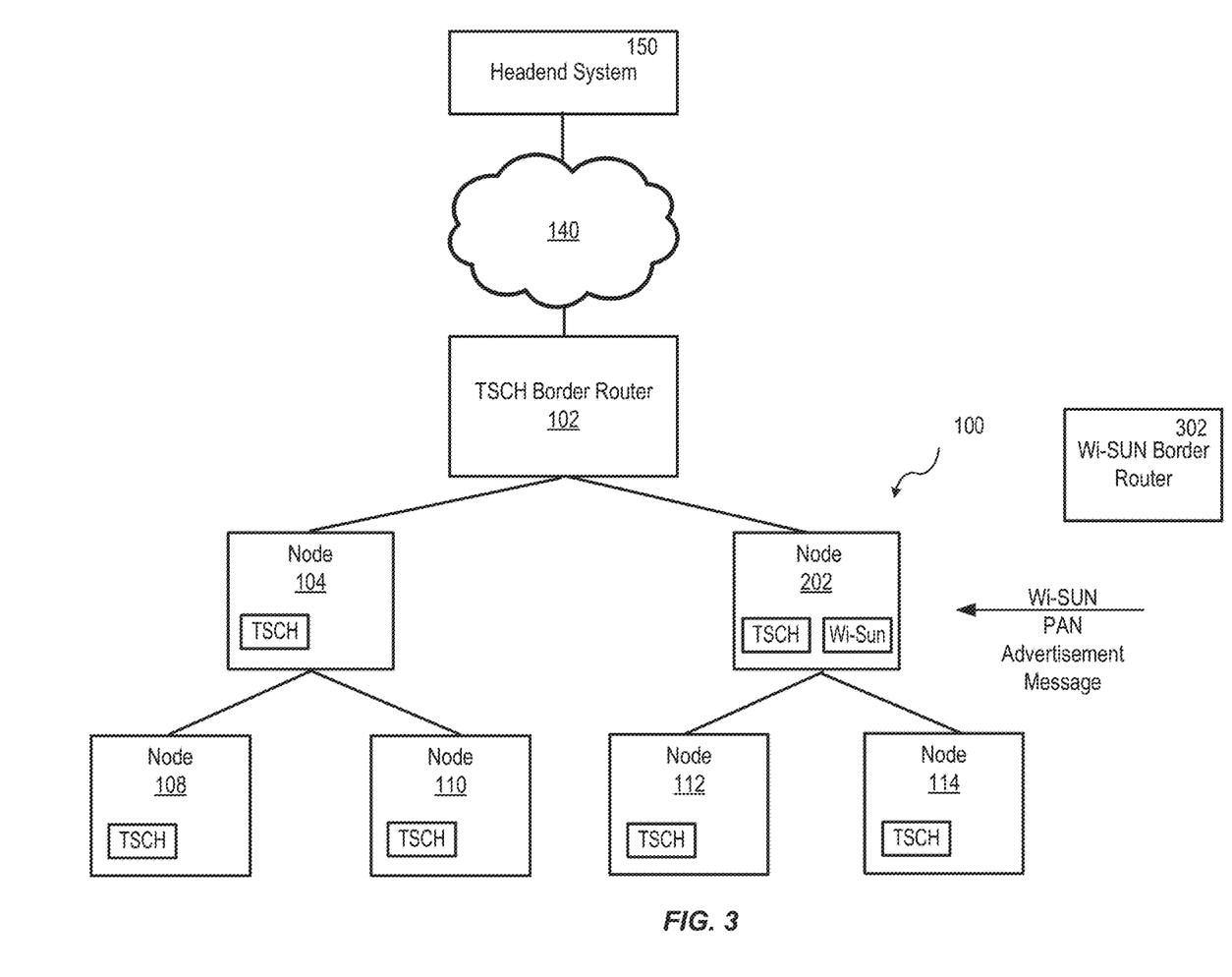
FIG. 3 is a block diagram illustrating two exemplary wireless networks running two different communication protocols.

In FIG. 3, border router 302 is deployed and runs a WI-SUN FAN communication protocol. In addition to border router 302, there may be additional nodes (not shown) that are joined to the WI-SUN FAN PAN and in communication with border router 302. The deployment of border router 302 may be based on a determination that there are a sufficient number of nodes, such as node 202, deployed in an area so that the nodes and the border router will form a reliable WI-SUN FAN PAN.

During one of its background scans, node 202 receives an unsolicited PAN advertisement message from the border router 302 or another node in the WI-SUN FAN PAN. Node 202 evaluates criteria associated with the PAN advertisement message to validate it. The criteria may include, but are not limited to, a network identifier included in the PAN advertisement message, signal strength, and link quality. In one example, the signal strength may be evaluated by comparing the signal strength of the PAN advertisement message to a noise floor. The link quality may be evaluated by considering the signal to noise ratio (SNR) of the PAN advertisement message. The criteria used may vary based on the particular implementation and may be selected so that a node does not act on a PAN advertisement message from a rogue, unknown, or otherwise unauthorized network or attempt to join an unreliable network. The network identifier in the PAN advertisement message identifies WI-SUN FAN PAN 300. In some implementations the WI-SUN FAN network is associated with a resource distribution network, such as an electric grid, and the nodes correspond to metering, sensor, or actuator devices. In these implementations the network identifier may be associated with a utility. Node 202 may validate the PAN advertisement when the network identifier corresponds to predetermined identifier and/or the signal strength or the link quality is within a predetermined range.

Figure 4:
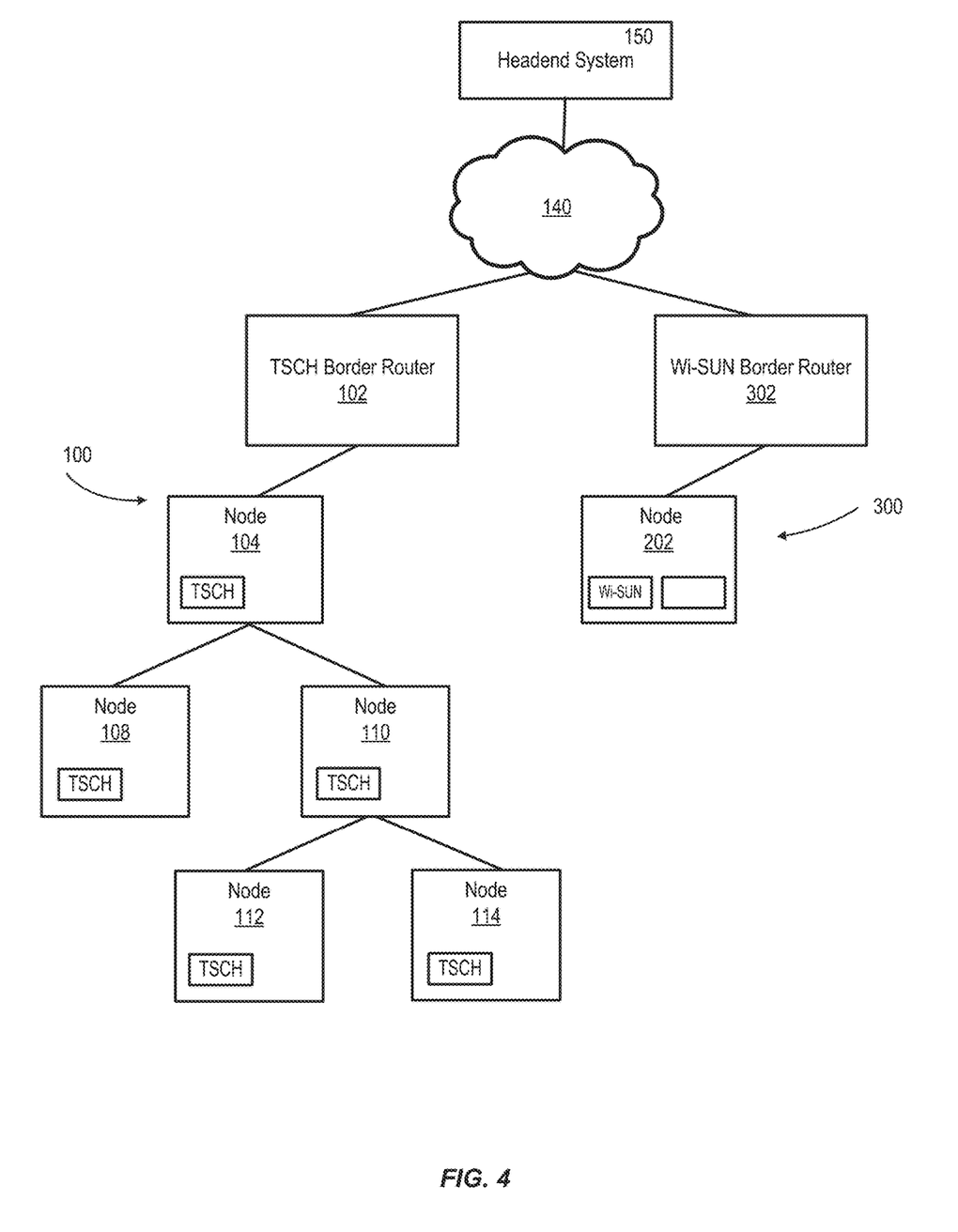
FIG. 4 is a block diagram illustrating two exemplary wireless networks after a communication protocol switch by one of the nodes.

Once node 202 validates the PAN advertisement message received from the WI-SUN FAN PAN, node 202 activates the WI-SUN FAN firmware image. In one example, node 202 marks the WI-SUN FAN firmware image as activated and then reboots. The bootloader loads the WI-SUN FAN firmware image into execution flash memory. Upon reboot, node 202 begins executing the WI-SUN FAN firmware image and begins the process to join the WI-SUN FAN PAN 300. The process to join the WI-SUN FAN PAN 300 may include a certificate-based authentication process conducted with border router 302. FIG. 4 illustrates node 202 joined to WI-SUN FAN PAN 300. FIG. 4 also shows that nodes 112, 114 that were child nodes of node 202 when node 202 was joined to the TSCH PAN 100 remain on the TSCH PAN after finding a new parent node.

Prior to rebooting, the node may store keys for the TSCH PAN 100. The keys may be stored separately from the firmware images and may be encrypted. The node may also copy the TSCH firmware image to the secondary flash memory bank. The TSCH firmware image in the execution flash memory bank may be marked for deletion or may be overwritten by the WI-SUN FAN firmware image. If node 202 cannot join the WI-SUN FAN PAN 300, then it can activate the TSCH firmware image and initiate a reboot. Upon reboot, node 202 begins executing the TSCH firmware image and begins the process to join the TSCH PAN 100 using the stored keys.

Figure 5:
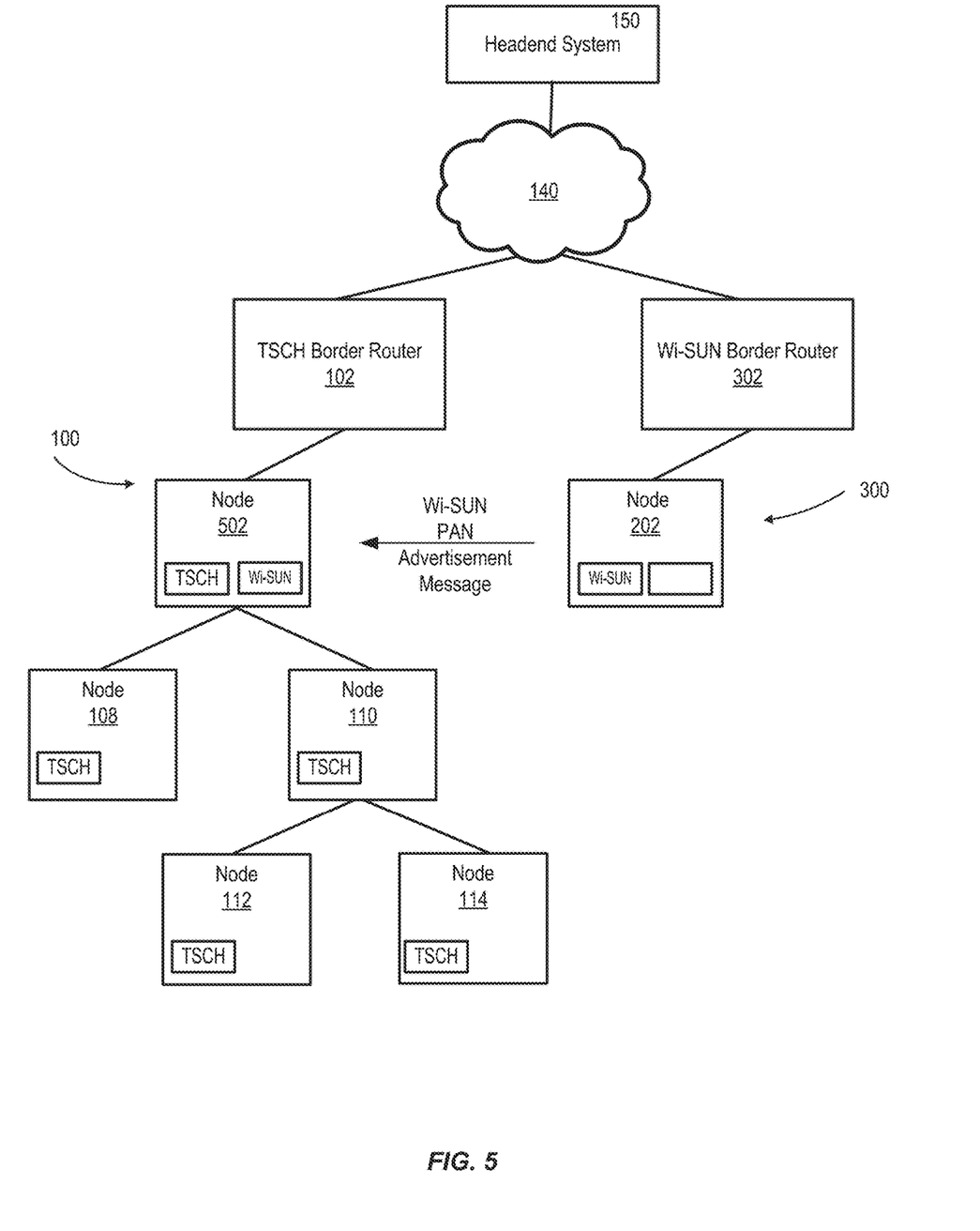
FIG. 5 is a block diagram illustrating two exemplary wireless networks running two different communication protocols.

FIG. 5 illustrates the TSCH PAN 100 after node 104 is replaced with node 502. Node 502 includes two firmware images, one for the TSCH communication profile stored in an execution flash memory bank and one for a WI-SUN FAN communication profile stored in a secondary flash memory bank, similar to node 202. In FIG. 5, node 502 is joined to the TSCH network and is executing the firmware image that corresponds to the TSCH communication profile. Node 502 conducts background scans to listen for unsolicited PAN advertisement messages. During one of its background scans, node 502 receives an unsolicited PAN advertisement message from the border router 302, node 202, or another node in WI-SUN FAN PAN 300. In this example, node 502 does not attempt to join the WI-SUN FAN PAN 300 since if it did, nodes 108, 110, 112, 114 would not have a path back to border router 102. Instead, it remains on the TSCH PAN 100. In one example, node 502 considers whether neighboring nodes, including nodes 108, 110, 112, 114, have a WI-SUN FAN firmware image when determining whether to attempt to join the WI-SUN FAN PAN.

The foregoing example uses a first firmware image that corresponds to a TSCH communication profile and a second firmware image that corresponds to a WI-SUN FAN communication profile. In this example, the MAC and PHY layers are compatible for the two communication profiles since the profiles use the same data rate, modulation index, and channel spacing. When node 202 is joined to the TSCH PAN 100 and receives an unsolicited PAN advertisement message from the WI-SUN FAN PAN 300, the MAC layer of node 202 recognizes that the message is a WI-SUN FAN message and initiates the process to validate the PAN advertisement message as coming from an authorized WI-SUN FAN PAN, as described above. The invention is not limited to switching from TSCH or switching between TSCH and WI-SUN FAN. Other implementations are possible and include those where the current network may decode the frames of another network.

Furthermore, there are other implementations that do not require communication profiles that use compatible MAC and PHY layers. In these examples, the PHY layer may need to be reconfigured when conducting a background scan for PAN advertisement messages from a network with a different communication profile, and when switching firmware images. If the current communication profile is TSCH, then the node may reconfigure its PHY layer to conduct a background scan after the receive portion of the TSCH timeslot passes. If the current communication profile is WI-SUN FAN or another profile that is not time synchronized, then the node may be unavailable on its current network when conducting the background scan.

Examples with incompatible MAC and PHY layers include those where the network stack implementation is being corrected by changing the calculation of the cyclic redundancy check in the MAC layer or by changing the representation of the universal/local bit flipping in the addressing of the IPv6 layer. In these examples, even though the domain of implementation remains the same (i.e., both WI-SUN FAN profiles or both TSCH profiles), a switch to a different firmware image is required.

Reversion to Previous Network

In some implementations, when node 202 begins executing the WI-SUN FAN firmware image and/or joins the WI-SUN FAN PAN, it operates in a reversion period or reversion window. The reversion period is a predetermined period of time during which the node monitors certain reversion criteria to determine whether it should remain on the WI-SUN FAN PAN or revert to the TSCH PAN. The reversion criteria may include one or more operational parameters associated with the WI-SUN FAN PAN. The node may compare the operational parameters to a predetermined range or threshold. If the comparison indicates that the operational parameters are within the predetermined range(s) and/or predetermined threshold(s), then the node remains on the WI-SUN FAN PAN. If the comparison indicates that the operational parameters are outside the predetermined range(s) and/or predetermined threshold(s), then the node may revert back to the TSCH PAN. The operational parameters may be implementation specific. They include, but are not limited to: parameters used on the Wi-SUN FAN PAN network, but not the TSCH network; SNR; baud rate; application-specific parameters; and the capacity of a parent node in the Wi-SUN FAN PAN network. In order to support a possible reversion to the TSCH PAN, the node stores the TSCH network keys when it activates the WI-SUN FAN firmware image, so that it can rejoin the TSCH PAN.

In some implementations, there may be other criteria that are considered before the node reverts to the TSCH PAN. For example, the node may consider characteristics of the TSCH PAN before reverting. If there are only a limited number of nodes remaining in the TSCH PAN, the node may determine that it will remain on the WI-SUN FAN PAN or seek an different Wi-SUN FAN PAN.

The reversion period is a limited amount of time and once it expires, the node cannot revert back to the TSCH PAN. In one implementation, the reversion period is approximately 24 hours. The system minimizes the possibility that the node repeatedly switches PANs by limiting the reversion period to a predetermined time period after the node activates the Wi-SUN FAN firmware image or joins the WI-SUN FAN network.

Exemplary Node

Figure 6:
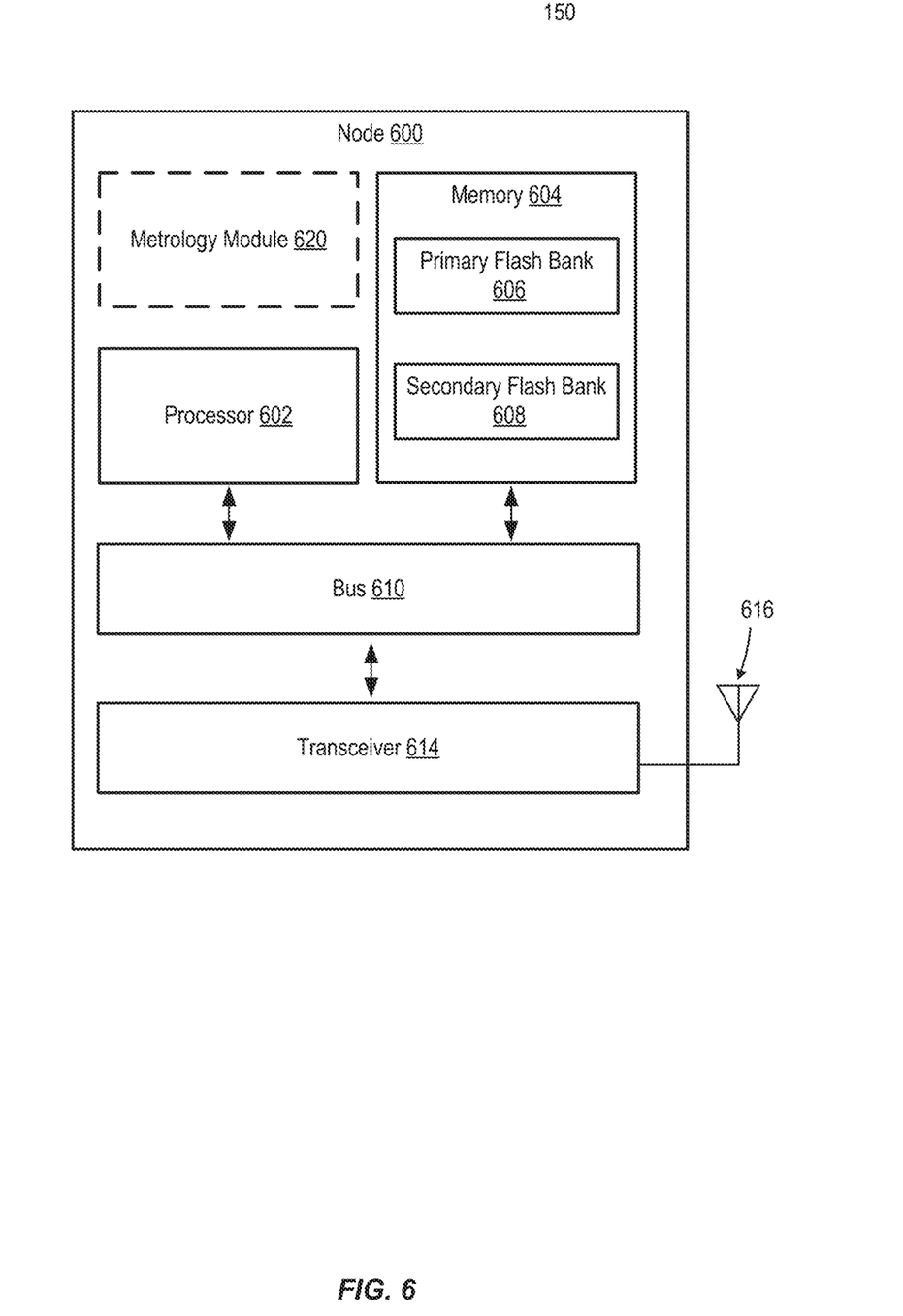
FIG. 6 is a block diagram illustrating an exemplary node.

FIG. 6 illustrates an exemplary node 600, which includes a processor 602, memory 604, a transceiver 614, and a bus 610. The memory may include an execution or primary flash memory bank 606 and a secondary flash memory bank 608. The memory may be a computer-readable medium and in addition to storing firmware images, may store computer executable instructions which when executed by the processor may configure the node to perform the operations described herein.

The transceiver 614 may be connected to antenna 616, and the transceiver may send and receive communications on a network.

Other components, connections between components, and arrangements of components other than those shown in FIG. 6 are possible. For example, the memory and processing device may be included in a single component, such as a microcontroller.

In some examples, node 600 may be included in a metering device that measures the consumption of a resource, such as gas, electricity, or water at a premises. In these examples, the metering device may include a metrology module 620 and the node may include connections to a resource distribution system, such as the electric grid, and to an associated premises. In other examples, the node may be any type of network device, including a bell-weather meter, a line sensor, an actuator, a capacitor-bank controller, etc., and may be running any type of application.

Exemplary Methods of Operation

Figure 7:
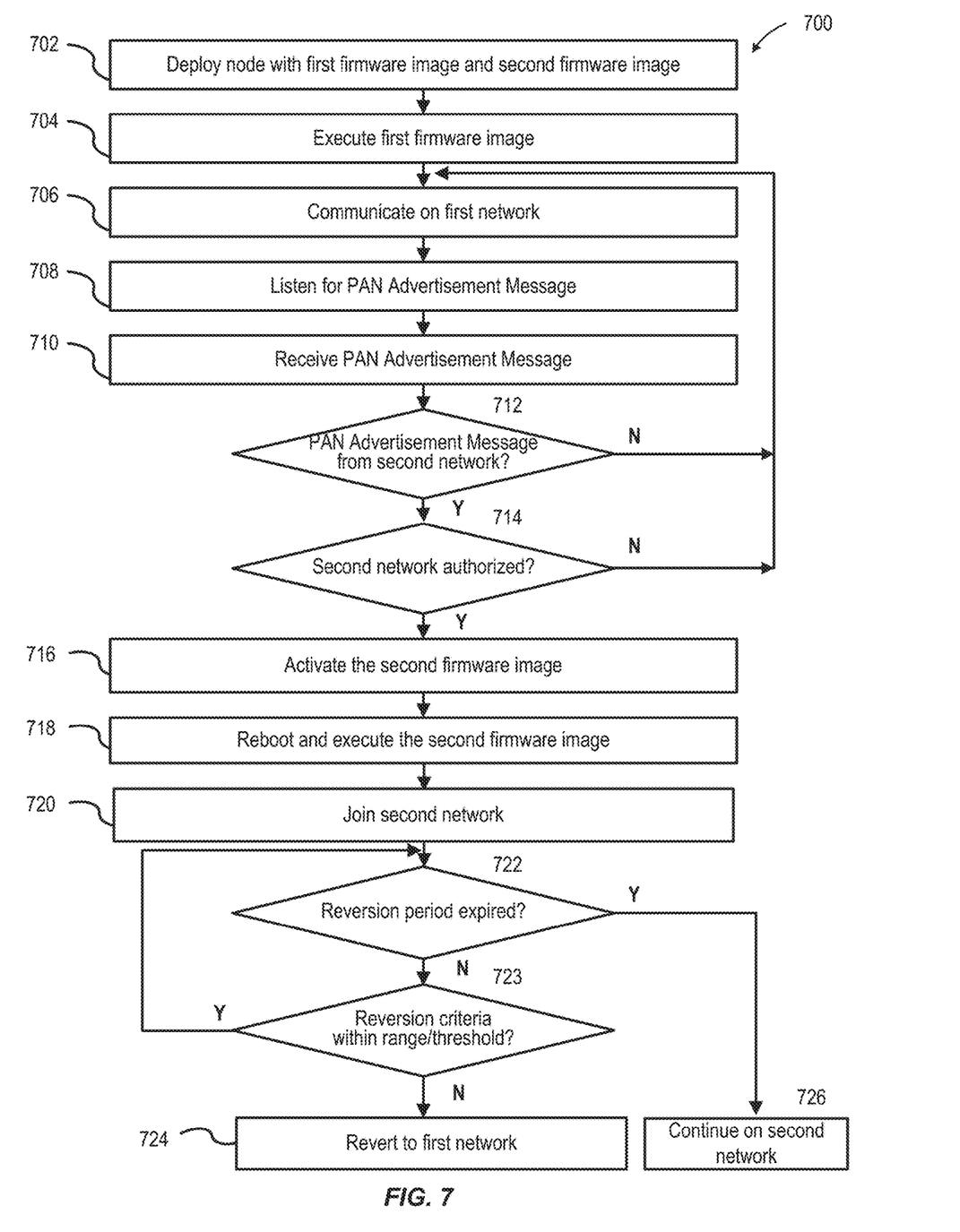
FIG. 7 is a flow diagram illustrating an exemplary method of switching from a first firmware image to a second firmware image.

FIG. 7 illustrates an exemplary method 700 performed by a node that includes a first firmware image corresponding to a first communication protocol and a second firmware image corresponding to a second communication protocol. FIG. 7 represents an example of the node automatically switching from the first communication protocol to the second communication protocol while the node is deployed. The switch does not require any manual or headend system intervention with the node.

The method starts at block 702, by deploying a node that has a first firmware image corresponding to a first communication protocol and a second firmware image corresponding to a second communication protocol. The node executes the first firmware image in block 704 and communicates on a first network that runs the first communication protocol in block 706. While the node is joined to the first network, it listens for PAN advertisement messages in block 708 and receives a PAN advertisement message in block 710. The node determines whether the PAN advertisement message is from a second network running a second communication protocol in block 712. If the PAN advertisement message is not from the second network, then the method proceeds via the NO branch to block 706. Although not shown in FIG. 7, if the PAN advertisement is from another PAN running the first communication protocol, the node may determine whether to remain on the current PAN (returning to block 706) or to switch to another PAN running the first communication protocol (not shown).

If the PAN advertisement message is from the second network, then the method proceeds via the YES branch to block 714 where the node determines whether the second network is authorized. The node may consider the network identifier in the PAN advertisement message to determine if the second network is authorized. Additional criteria, including signal strength and link quality may also be considered. If the second network is not authorized, then the method proceeds via the NO branch to block 706 and the node remains on the first network.

If the second network is authorized, then the method proceeds via the YES branch to block 716 and activates the second firmware image. In some implementations, the node copies the second firmware image into the execution flash memory bank to activate the image. In block 718, the node reboots and begins executing the second firmware image. The node joins the second network in block 720.

After the node is joined to the second network, it determines whether a reversion period has expired in block 722. If the reversion period has not expired, then the method proceeds via the NO branch to block 723. The node evaluates reversion criteria to determine whether it is within a predetermined range or threshold. If the reversion criteria is within the predetermined range or threshold, then then node continues to operate on the second network and returns to block 722 via the YES branch.

If the reversion criteria is outside the predetermined range or threshold, then then the method proceeds via the NO branch from block 723 to block 724 and the node reverts to the first network. In some implementations, additional factors may be considered prior to determining that the node will revert to the first network.

Once the reversion period expires, the node remains on the second network, as illustrated by the YES branch from block 722 to block 726.

The method of FIG. 7 may be modified to include additional or fewer steps, as well as to perform the steps in different orders.

The foregoing is provided for purposes of illustrating, describing, and explaining aspects of the present invention and is not intended to be exhaustive or to limit the invention to the precise forms disclosed. Further modifications and adaptation of these embodiments will be apparent to those skilled in the art and may be made without departing from the scope and spirit of the invention. Different arrangements of the components described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent.

What is claimed is:

1. A node, comprising:
a processor;
a wireless transceiver communicatively coupled to the processor and configured to receive wireless communications; and
a memory communicatively coupled to the processor, the memory storing a first firmware image which corresponds to a time synchronized channel hopping (TSCH) protocol and a second firmware image which corresponds to a wireless smart utility network field area network (Wi-SUN FAN) protocol, and comprising instructions that are executable by the processor to cause the processor to:
execute the first firmware image;
communicate on a TSCH network;
while joined to the TSCH network, scan for personal area network (PAN) advertisement messages;
receive a first PAN advertisement message;
process the first PAN advertisement message to determine whether the first PAN advertisement message is a Wi-SUN FAN PAN advertisement message;
when the first PAN advertisement message is a Wi-SUN FAN PAN advertisement message, determine whether the first PAN advertisement message is from an authorized WI-SUN FAN network;
when the first PAN advertisement message is from the authorized WI-SUN FAN network, activate the second firmware image;
initiate a reboot of the node, wherein the node executes the second firmware image after the reboot; and
initiate a joining process to join the authorized Wi-SUN FAN network identified in the first PAN advertisement message.

2. The node of claim 1, wherein the memory further comprises instructions that are executable by the processor to determine whether the first PAN advertisement message is from an authorized WI-SUN FAN network by evaluating a network identifier in the first PAN advertisement message to determine whether the network identifier is associated with the authorized Wi-SUN FAN network.

3. The node of claim 2, wherein the memory further comprises instructions that are executable by the processor to further compare at least one of signal strength or link quality associated with the first PAN advertisement message to a predetermined range when determining whether the first PAN advertisement message is from an authorized WI-SUN FAN network.

4. The node of claim 1, wherein the memory further comprises instructions that are executable by the processor to continue executing the first firmware image and to remain on the TSCH network when the first PAN advertisement message is from an unknown network.

5. The node of claim 1, wherein the memory comprises an execution flash memory bank and a secondary flash memory bank, and when the node communicates on the TSCH network, the execution flash memory bank stores the first firmware image and the secondary flash memory bank stores the second firmware image, and wherein the memory further comprises instructions that are executable by the processor to load the second firmware image into the execution flash memory bank to activate the second firmware image.

6. The node of claim 5, wherein the memory further comprises instructions that are executable by the processor to maintain keys for the TSCH network when the second firmware image is loaded in the execution flash memory bank.

7. The node of claim 1, wherein the memory further comprises instructions to:
join the authorized Wi-SUN FAN network;
authenticate the node on the authorized WI-SUN FAN network;
evaluate reversion criteria associated with operation of the node on the authorized Wi-SUN FAN network for a predetermined period of time after joining the authorized WI-SUN FAN network; and
when the reversion criteria is outside a predetermined range, revert back to the TSCH network.

8. A method for switching communication protocols, the method comprising:
executing, by a processor of a node, a first firmware image corresponding to a first wireless communication protocol;
communicating on a first wireless network using the first wireless communication protocol;
while joined to the first wireless network, scanning for personal area network (PAN) advertisement messages;
receiving a first PAN advertisement message;
processing the first PAN advertisement message to determine whether the first PAN advertisement message is a PAN advertisement message for a network using a second wireless communication protocol;
when the first PAN advertisement message is the PAN advertisement message for the network using the second wireless communication protocol, evaluating a network identifier associated with the first PAN advertisement message to determine if the first PAN advertisement message is from an authorized network;
when the first PAN advertisement message is from the authorized network, activating a second firmware image, the second firmware image corresponding to a second wireless communication protocol;
rebooting the node;
executing, by the processor of a node, the second firmware image; and
joining the authorized network identified in the first PAN advertisement message.

9. The method of claim 8, wherein activating a second firmware image comprises loading the second firmware image into an execution flash memory bank.

10. The method of claim 8, further comprising:
after determining that the first PAN advertisement message is from an authorized network, evaluating network criteria associated with the authorized network to determine whether to activate the second firmware image.

11. The method of claim 8, wherein the first wireless communication protocol is one of a time synchronized channel hopping (TSCH) protocol or a wireless smart utility network field area network (Wi-SUN FAN) protocol and the second wireless communication protocol is the other of TSCH or WI-SUN FAN.

12. The method of claim 8, further comprising:
after joining the authorized network, evaluating reversion criteria associated with operation of the node on the authorized network during a predetermined period of time; and
when the reversion criteria is outside a predetermined range, determining to revert back to the first wireless network.

13. The method of claim 12, wherein keys for the first wireless network are stored prior to rebooting the node, further comprising:
reverting to the first wireless network by:
activating the first firmware image;
rebooting the node;
executing, by the processor of a node, the first firmware image; and
using the keys to join the first wireless network.

14. The method of claim 8, wherein when the first PAN advertisement message is from an unknown network, continuing to execute the first firmware image and remaining on the first wireless network.

15. A method, comprising:
operating a first node on a first wireless network using a first communication protocol, wherein the first node executes a first firmware image to communicate on the first wireless network;
operating a border router for a second wireless network using a second communication protocol; and
switching the first node from the first wireless network to the second wireless network, wherein the first node operates by:
scanning for personal area network (PAN) advertisement messages while operating on the first wireless network;
receiving a first PAN advertisement message from the second wireless network;
processing the first PAN advertisement message to determine a network associated with the first PAN advertisement message and at least one operational characteristic of the second wireless network;
when the first PAN advertisement message is from the second wireless network and the operational characteristic of the second wireless network is within a predetermined range, then activating a second firmware image;
initiating a reboot of the first node, wherein the first node executes the second firmware image after the reboot; and
initiating a joining process to join the second wireless network identified in the first PAN advertisement message using the second communication protocol so the first node switches from the first wireless network to the second wireless network.

16. The method of claim 15, wherein the first node includes an execution flash memory bank and a secondary flash memory bank, and wherein the first node further operates by:
executing the first firmware image from the execution flash memory bank while operating on the first wireless network;
copying the second firmware image from the secondary flash memory bank to the execution flash memory bank to activate the second firmware image; and
executing the second firmware image from the execution flash memory bank while initiating the joining process to join the second wireless network.

17. The method of claim 15, wherein the first node further operates by:
evaluating a network identifier in the first PAN advertisement message to determine whether the network identifier is associated with the second wireless network.

18. The method of claim 17, wherein when the network identifier in the first PAN advertisement message is associated with an unknown wireless network, then the first node further operates by continuing on the first wireless network.

19. The method of claim 15, wherein the first node further operates by:
maintaining keys for the first wireless network when activating the second firmware image.

20. The method of claim 15, wherein the first node further operates by:
   joining the second wireless network;
   evaluating reversion criteria associated with operation of the first node on the second wireless network for a predetermined period of time after joining the second wireless network; and
   when the reversion criteria is outside a predetermined range, revert back to the first wireless network.

* * * * *